United States Patent [19]

Lang

[11] Patent Number: 5,134,329
[45] Date of Patent: Jul. 28, 1992

[54] SELF-VENTILATED ELECTRICAL MACHINE WITH ARRANGEMENT TO FACILITATE ASSEMBLY AND DISMANTLING OF THE VENTILATOR DISK

[75] Inventor: Karl Lang, Berlin, Fed. Rep. of Germany

[73] Assignee: Siemens Aktiengesellschaft, Berlin & Munich, Fed. Rep. of Germany

[21] Appl. No.: 730,973

[22] PCT Filed: Jan. 26, 1989

[86] PCT No.: PCT/DE89/00047

§ 371 Date: Jul. 26, 1991

§ 102(e) Date: Jul. 26, 1991

[87] PCT Pub. No.: WO90/09052

PCT Pub. Date: Aug. 9, 1990

[51] Int. Cl.⁵ .......................... H02K 9/00; H02K 9/06
[52] U.S. Cl. ................................ 310/63; 310/58
[58] Field of Search .................. 310/42, 58, 61, 63, 310/89, 52

[56] References Cited

U.S. PATENT DOCUMENTS

| | | | |
|---|---|---|---|
| 2,286,750 | 6/1942 | McMahan | 171/252 |
| 4,441,042 | 4/1984 | Colwell | 310/42 |
| 4,564,775 | 1/1986 | Mazzorana | 310/63 X |
| 4,956,572 | 9/1990 | Strobl | 310/42 X |

FOREIGN PATENT DOCUMENTS

| | | | |
|---|---|---|---|
| 598157 | 3/1960 | Canada | 310/63 |
| 2135653 | 1/1973 | Fed. Rep. of Germany | |

OTHER PUBLICATIONS

Search Report, dated Oct. 11, 1989, 5 pages.

Primary Examiner—Steven L. Stephan
Assistant Examiner—E. H. To
Attorney, Agent, or Firm—Kenyon & Kenyon

[57] ABSTRACT

In a self-ventilated electrical machine with vertical shaft, the ventilator is centered and releasably fastened to a hub on the rotor shaft below the stack of rotor plates. The ventilator must be detached from the hub before it can be removed from the housing of the machine. To facilitate assembly and dismantling of the ventilator disk on the hub, the hub has an annular protuberance which can be gripped radially from behind. At least three mobile clamping pieces are distributed uniformly around its circumference and can be engaged by interlocking or friction. The clamping pieces are carried by the ventilator disk and at least one limit stop for each clamping piece is arranged on the holding device for each clamping piece. This clamping connection of the ventilator to the hub of the rotor shaft is particularly suitable for self-ventilated high-voltage motors with high output and with a vertical rotor shaft.

9 Claims, 2 Drawing Sheets

SELF-VENTILATED ELECTRICAL MACHINE WITH ARRANGEMENT TO FACILITATE ASSEMBLY AND DISMANTLING OF THE VENTILATOR DISK

BACKGROUND OF THE INVENTION

The present invention relates to an electrical machine with a vertical shaft and a fan secured on the rotor shaft below the rotor plate packet, centered on a hub and removable from the hub.

In known self-ventilated vertical electrical machines, a fan for circulating cooling air is customarily arranged below the electrically active parts of the rotor in such a way that the cooling air can be drawn in from above the machine with as few impurities as possible and be blown out in a bottom region of the machine. Further, it must be possible to lift the rotor upward out of the machine casing for maintenance purposes. This, however, requires first unscrewing the fan, which generally has a greater diameter than the rotor, and depositing it in the casing.

Usually, axially extending screws are used to fasten the fan on the hub. When reinstalling the rotor after maintenance, the fan must then again be centered on the hub, and the attachment holes in the fan and in the hub must register exactly in circumferential direction to be able to introduce the axial screws. This may present difficulties for machines of relatively great power because vision onto the location of the fan attachment is obstructed by the casing. Besides, the weight of the rotor of the electrical machine, as well as that of the fan, hinders the assembly operation.

SUMMARY OF THE INVENTION

The present invention overcomes these difficulties by providing a design of a centering detachable attachment of the fan on the hub of the rotor shaft in such a way that easy assembly or disassembly is possible.

To solve this problem, a vertical electrical machine of the initially described kind is designed according to the present invention in such a way that on an end face, away from the rotor plate packet, the hub of the fan has an annular projection to be gripped from behind in a radial direction. At at least three points evenly distributed over the circumference of the fan disk there are clamping pieces movable in the radial direction that can be brought into positive and frictional engagement on the annular projection. On the retention mechanism of each clamping piece at the fan disk, at least one stop is provided which limits the radial movement of the clamping piece inwardly.

Thus, a clamping connection is provided between the fan and the hub on the rotor shaft that is independent of the circumferential position of the fan disk relative to the hub. No additional imbalance is created due to the use of annular or evenly distributed parts.

In the vertical electrical machine designed according to the present invention, clamping pieces are provided in at least three points, evenly distributed along the inner circumference of the fan disk. The clamping pieces, through a movement directed radially outward, abut positively at a corresponding counterface, engageable from behind, of a projection at the fan hub. The abutment brings about the positive and frictional clamp union. The clamp union is released in a simple manner by an oppositely directed movement, radially inward. The movement of the clamping piece in the radial direction inward is limited by a stop, which during disassembly prevents the clamping piece from becoming detached from the attachment to the fan disk and falling into the machine casing. The stop permits the freedom of movement in the radial direction necessary for making and breaking the positive and frictional clamping. Since the projection on the fan hub that permits the positive engagement for the clamp union is annular, total independence from the circumferential position is achieved, so that rotation of the rotor relative to the fan, which remains in the casing, has no influence on their mutual attachment to each other.

The radial movement of the clamping piece for establishing the clamp union can best be brought about by a radially directed screw which traverses a threaded bore in the clamping piece and is retained at the fan disk. This screw also carries the stop, which lies at a distance before an inner wall face of the clamping piece. This stop limits the possible radial movement of the clamping piece inward in such a way that the positive engagement required for the clamp union can be established or released without the clamping piece becoming detached from the fan disk.

It is further advisable to provide the clamping piece with a lug extending in a radial direction, which is guided on the fan disk within the entire possible radial displacement zone for the clamping piece. The clamping piece is thereby secured against rotation relative to the fan disk or the fan hub.

BRIEF DESCRIPTION OF THE DRAWINGS

The present invention will be explained more specifically with reference to the embodiments illustrated in the drawing figures.

DETAILED DESCRIPTION

Figure 1:
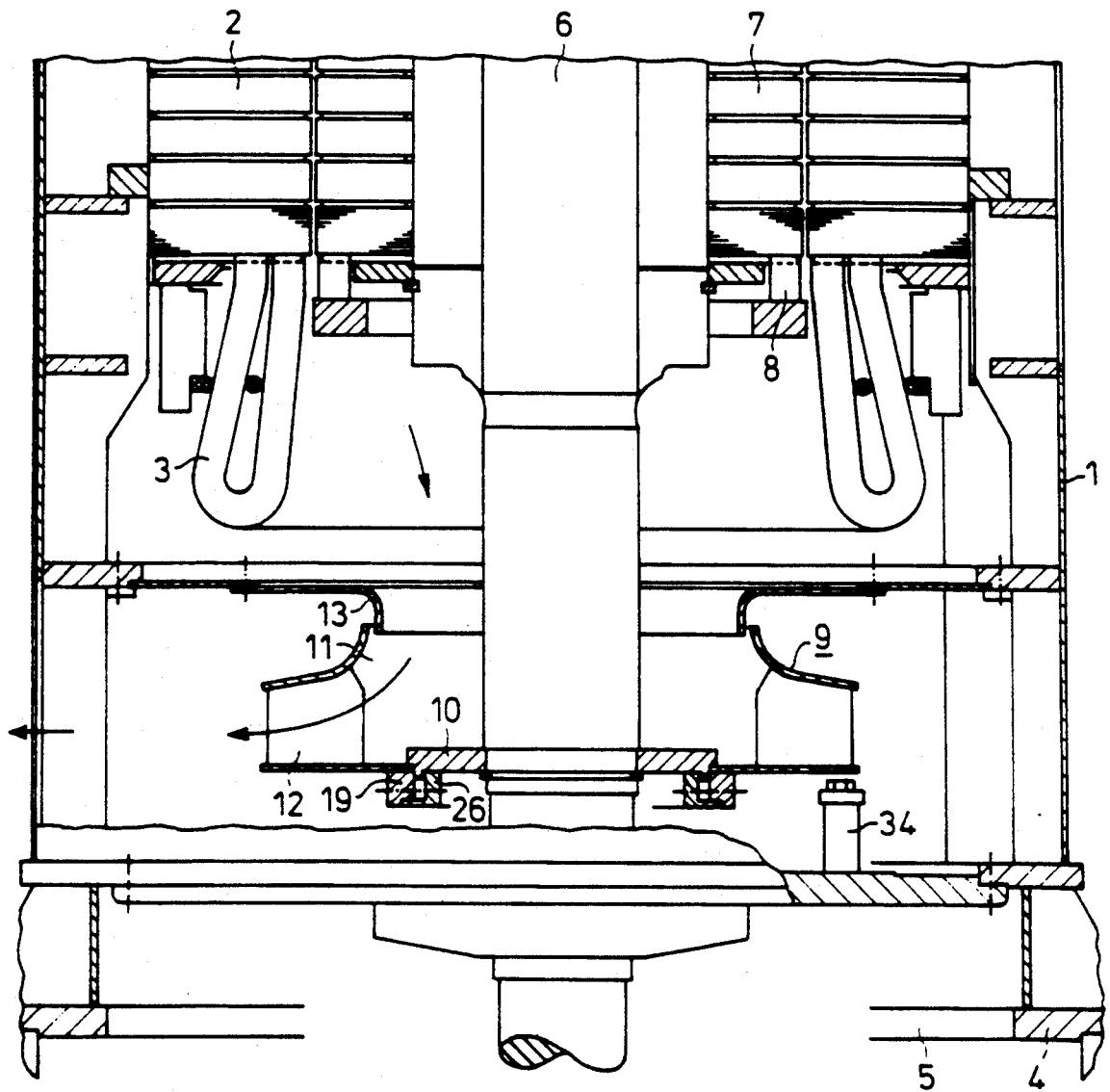
FIG. 1 shows, schematically, a partial longitudinal section through an electrical machine with vertical shaft.

An electric high-voltage motor of relatively great power for driving a work-performing machine, in particular, a pump, is designed as a vertical electric machine. The machine casing 1 with the stator 2 and the stator winding 3, of which only the lower part is shown in FIG. 1, stands on a base plate 4 over an opening 5 which is traversed by a vertical rotor shaft 6 perpendicular to the base plate 4, and under which the work-performing machine, not shown, is located, driven by the rotor shaft 6. The rotor shaft 6 carries also the rotor plate packet 7 with a cage winding 8.

For the purpose of self-ventilation of the high-voltage motor, a fan 9 is arranged below the electrically active part that is formed of a stator 2 with stator winding 3 and a rotor plate packet 7 with cage winding 8. The fan is centered on a hub 10 shrink-fitted on the rotor shaft 6 and is removably secured. This fan 9 is designed as a radial fan. With the fan blades 12 disposed on the fan disk 11, it draws cooling air which enters the machine via inlet openings in the upper part, not shown, of the machine casing 1 and is ejected again by the fan 9 via adjacent openings, also not shown, in the lower part of the machine casing 1. The cooling air stream is indicated by arrows in FIG. 1. For better air conduction, an air conduction nozzle 13 can be arranged to be secured to the machine casing 1, preceding the suction zone of fan 9 in the airflow.

High-voltage motors require that the electrically active part of the motor be made accessible for occasional maintenance tasks. To this end, the rotor shaft 6 with the rotor plate packet 7 and the cage winding 8 must be upwardly lifted out of the machine casing 1. But since, on account of the cooling air throughput required for effective cooling of the motor, the fan 9, also present on the rotor shaft 6, usually has a larger outside diameter than the rotor plate packet 7, it is necessary before such disassembly to detach the fan disk 11 at the hub 10. The rotor shaft 6 can then be lifted out together with the hub 10, as the diameter of hub 10 is smaller than the inside diameter of the air conduction nozzle 13 and the inside diameter of the stator 2.

Figure 2:
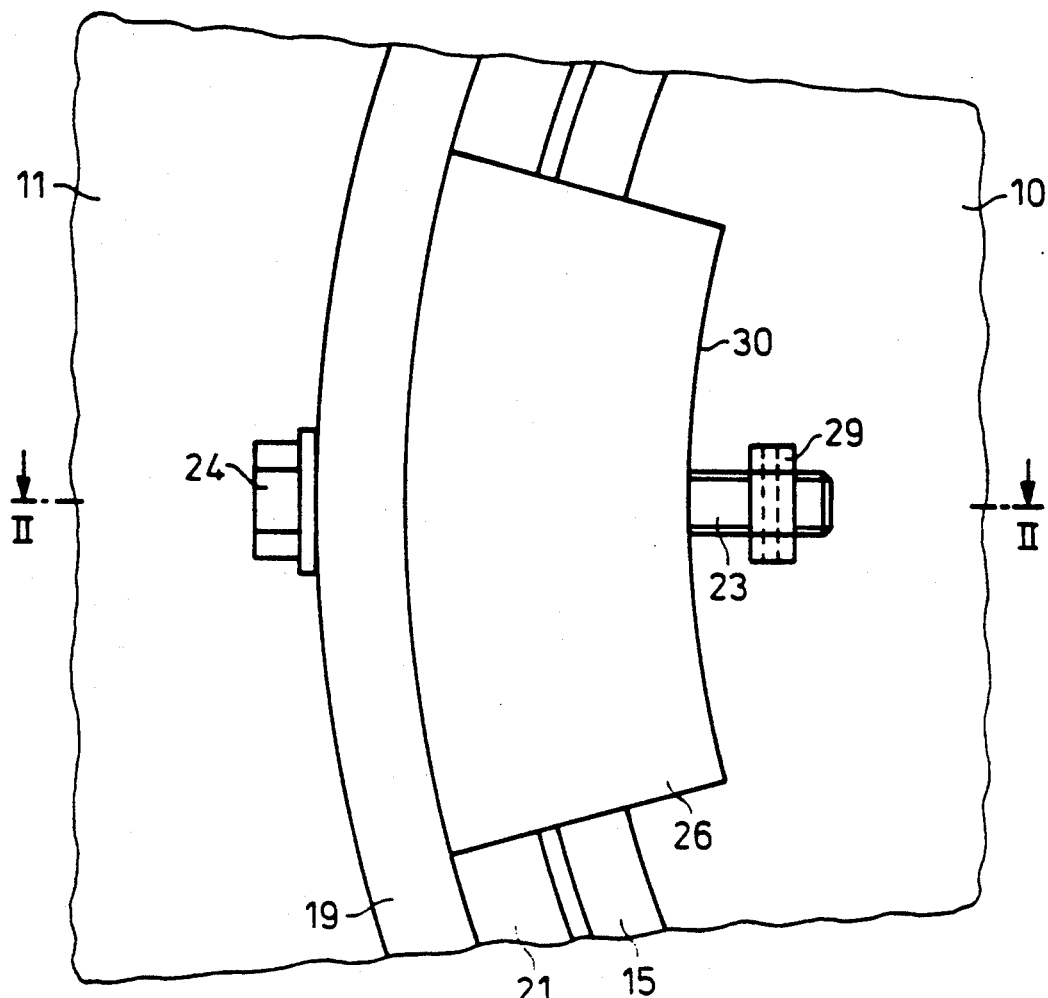
FIG. 2 discloses a larger scale view from below onto the attachment of the fan disk to the fan hub.
Figure 3:
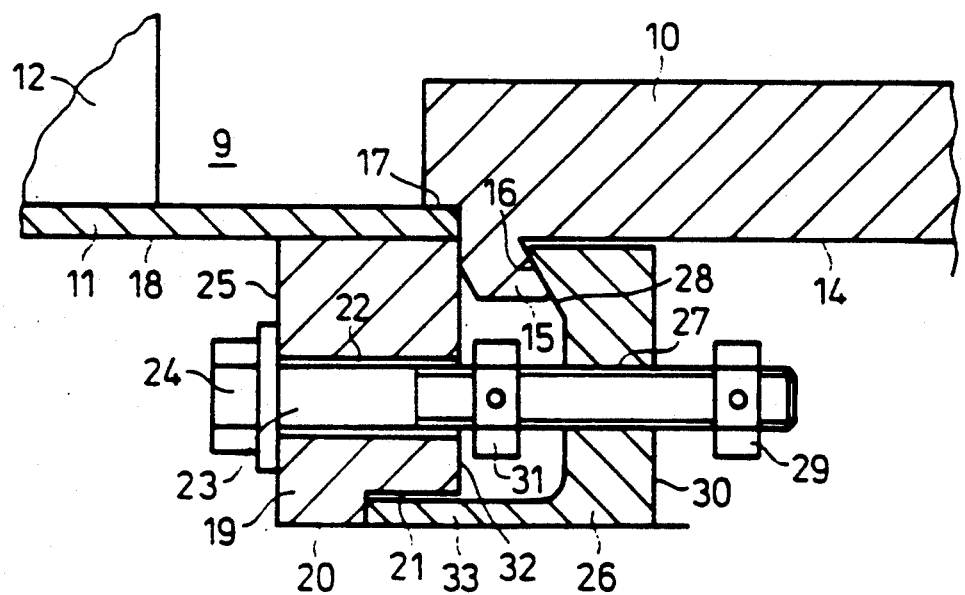
FIG. 3 discloses a corresponding radial section through this attachment.

To facilitate these necessary disassemblies or assemblies of the fan 9 at the rotor shaft 6, the detachable and centering union between hub 10 and fan disk 11 is designed as a clamp union, shown in enlarged scale in FIGS. 2 and 3. The same reference symbols are used for the same parts.

At the hub 10 for the fan 9, on the end face 14 away from the rotor plate packet 7, an annular projection 15 is provided, which is limited radially inward by the inclined face 16. Radially outward, the projection 15 terminates in the centering annular groove 17. The fan disk 11 abuts this centering annular groove 17 and is thus centered.

At the fan disk 11, on the end face 18 away from the fan blades 12, a protruding ring element 19 is arranged, which is provided on its end face 20 with an annular groove 21 open on one side. At several points evenly distributed along the circumference (at least three points) radially directed passage bores 22 are provided in this ring element 19. These passage bores 22 are traversed by a screw 23, whose head 24 abuts the radially external wall face 25 of the ring element 19. Each screw carries a clamping piece 26 in the form of a ring segment. The screw 23 is screwed into a radial threaded bore 27 of the clamping piece 26. At the clamping piece 26 a radially outward inclined face 28 is provided which matches the inclined face 16 of the projection 15 of hub 10 as to its inclination and arrangement.

If screw 23 is rotated with its head 24 remaining at the wall face 25, rotation in one direction causes a radially inward movement of the clamping piece 26 and rotation in the opposite direction causes a radially outward movement of the clamping piece. Thereby, the inclined face 28 at the clamping piece 26 can be made to abut and thus be in positive and frictional engagement, with the inclined face 16 of projection 15. Alternatively, the inclined face 28 at the clamping piece 26 can be forced out of abutment with the inclined face 16 of projection 15. The clamp union thus established occurs automatically as the two inclined faces 16 and 28 will necessarily abut.

An inner stop 29 is fastened onto screw 23 and is arranged before the wall face 30 of the clamping piece 26 at a distance great enough to permit complete release of the positive engagement in the clamp union. This prevents the clamping piece from falling off of the screw 23 upon a radially inward movement of the clamping piece 26. A second stop 31, also arranged on screw 23, lies in front of the wall face 32 at the ring element 19 and improves the retention of screw 23 in the ring element 19 or, when it comes to abut at this wall face 32, brings about a forced displacement of the clamping piece 26 inward, so that the clamp union releases.

Further, there is provided at the clamping piece 26 a lug 33 directed radially outward, which engages in the annular groove 21 of the ring element 19. The length of this lug 33 is chosen so that during the entire radial movement of the clamping piece 26 it remains inside the annular groove 21, so that the clamping piece 26 is guided in the ring element 19 and is secured against rotation.

It is extremely easy to secure the fan disk 11 on the hub 10 or to disassemble it again with this specifically designed clamp union between hub 10 and fan disk 11 whereby means of the radial movement of the clamping piece 26 is provided by rotation of the radially directed screw 23, toward or away from the inclined face 16 of the projection 15. Centering of the fan disk 11 occurs automatically in the centering edge 17. Due to the use of the annular parts at the fan disk, namely the ring element 19, and at the hub 10, namely the projection ring 15, this connection is completely independent of the circumferential position of the fan disk 11 relative to the hub 10. A rotation of the rotor shaft 6 during maintenance work with the rotor lifted out thus has no influence whatsoever on the reestablishment of the connection between fan disk 11 and hub 10.

In high-voltage motors the fan disk 11, with the fan blades 12, is relatively heavy. It is advisable to provide support screws 34 of FIG. 1 at several points distributed along the circumference. Before releasing the clamp union the support screws are brought into abutment at the end face 18 of the fan disk 11 and support this fan disk 11 in the disassembled state. This simplifies reassembly when the rotor shaft 6 with hub 10 is to be reconnected with the fan disk 11.

I claim:

1. In an electrical machine having a vertical shaft and a fan supported on a fan disk detachably secured and centered, on a rotor shaft below a rotor plate packet at a hub, an arrangement for coupling and decoupling the fan and the shaft comprising:
   an annular projection on an end face of the hub, away from the rotor plate packet, said annular projection engageable from behind in a radial direction;
   at least three clamping pieces disposed adjacent points evenly distributed over a circumference of the fan disk, said clamping pieces movable in a radial direction and which can be brought into positive and frictional engagement with said annular projection; and
   each clamping piece has a retention mechanism and further includes at least one stop, at the fan disk, said stop limiting the inwardly radial movement of the clamping piece inwardly.

2. The arrangement of claim 1, wherein said clamping piece is held at the fan disk by a radially directed screw traversing a threaded bore in the clamping piece, which carries the stop lying at a distance before a wall face of the clamping piece.

3. The arrangement of claim 1, wherein said clamping piece is provided with a lug extending in a radial direction which is guided at the fan disk within an entire possible radial displacement zone for the clamping piece.

4. The arrangement of claim 2, wherein said clamping piece is provided with a lug extending in a radial direction which is guided at the fan disk within an entire possible radial displacement zone for the clamping piece.

5. The arrangement of claim 1, wherein said annular projection at the hub and the clamping piece each have a matching inclined face which come into abutment with one another.

6. The arrangement of claim 2, wherein said annular projection at the hub and the clamping piece each have a matching inclined face which come into abutment with one another.

7. The arrangement of claim 3, wherein said annular projection at the hub and the clamping piece each have a matching inclined face which come into abutment with one another.

8. The arrangement of claim 4, wherein said annular projection at the hub and the clamping piece each have a matching inclined face which come into abutment with one another.

9. The arrangement of any of claims 1 to 8, wherein said clamping piece has the form of a ring engagement.

* * * * *